Aug. 6, 1957 G. C. F. ASKER 2,801,707
VALVELESS CONTINUOUS DEHUMIDIFIER
Filed July 23, 1954 2 Sheets-Sheet 2
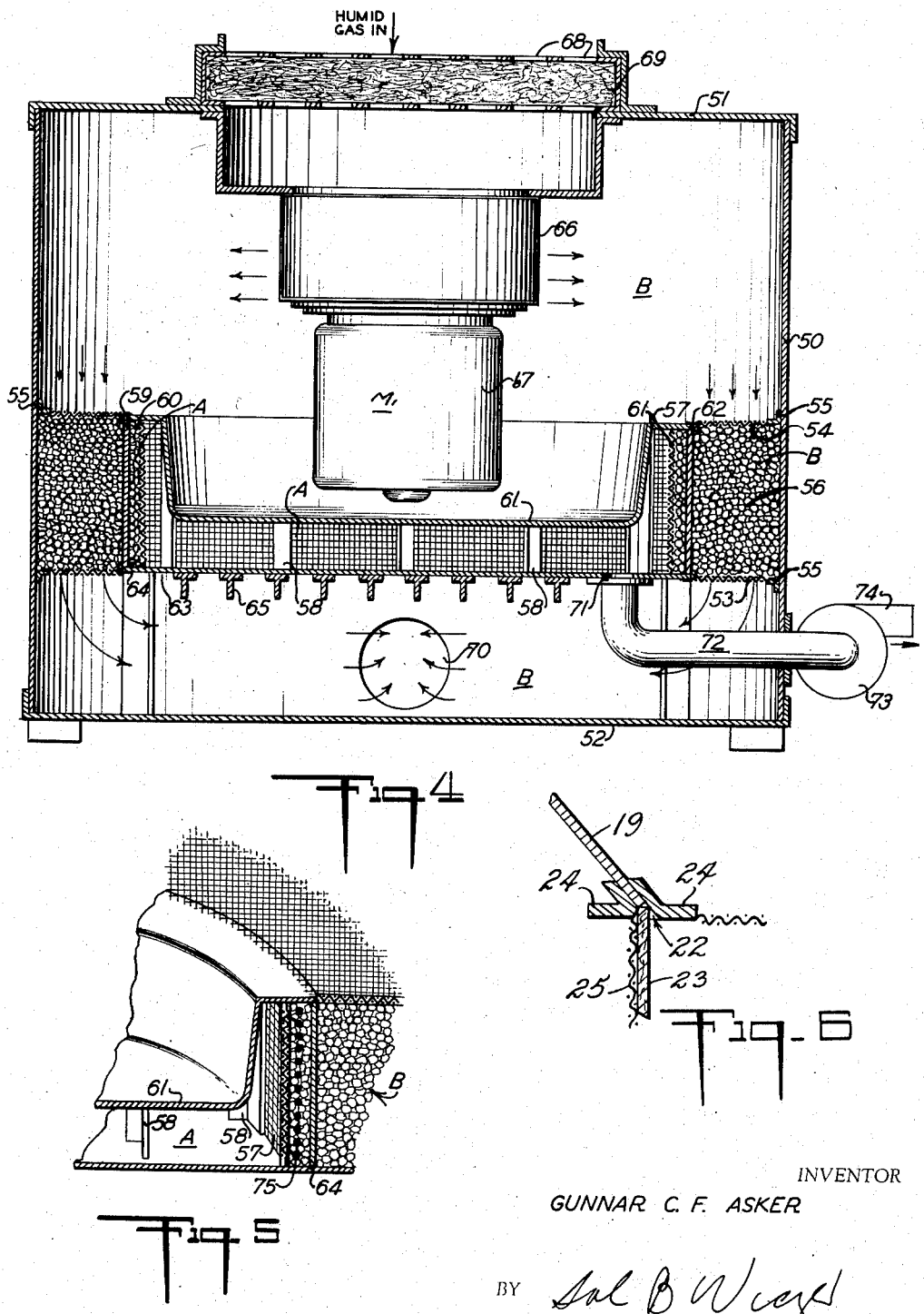
INVENTOR
GUNNAR C. F. ASKER
BY
ATTORNEY 2,801,707
Patented Aug. 6, 1957

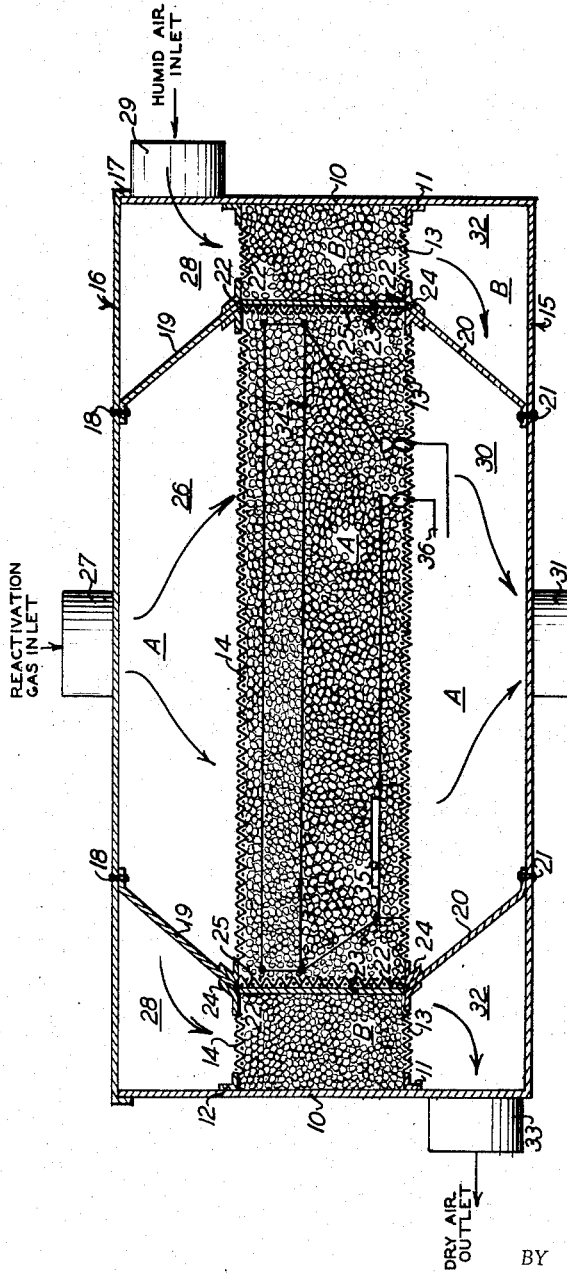
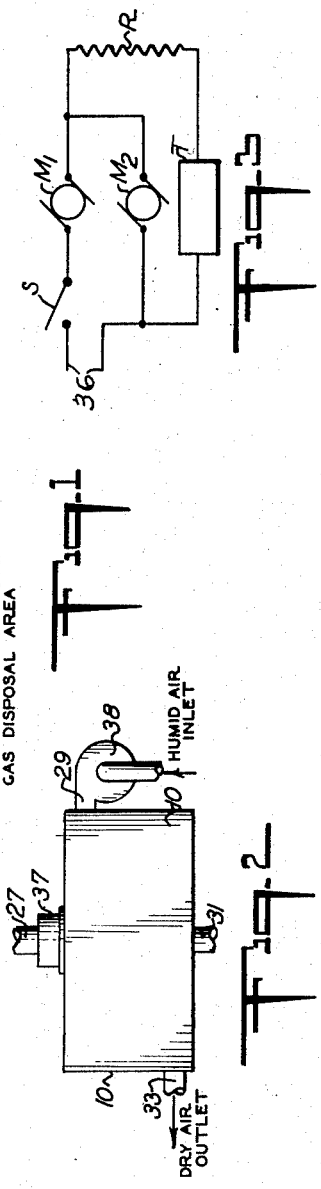

2,801,707
VALVELESS CONTINUOUS DEHUMIDIFIER

Gunnar C. F. Asker, Washington, D. C., assignor to Desomatic Products, Inc., Falls Church, Va., a corporation of Delaware Application July 23, 1954, Serial No. 445,317

17 Claims. (Cl. 183—4.5)

This invention relates to a gas drying method and apparatus for reducing the moisture content of air and other gases, particularly a valveless and stationary apparatus comprising a bed of granular desiccant materials with which moisture laden gases are contacted for drying of the gas by adsorption in the bed and from which the adsorbed moisture may be removed continuously as fast as it is adsorbed, and to an improved continuous method of drying gases.

This method and apparatus allows continuous adsorption of moisture from moisture laden gases and, simultaneously, regeneration of the desiccant bed used to adsorb the moisture, continuously, in contradistinction to present day alternating cycles of contact of the humid gas with a desiccant bed to remove the moisture and then terminating the adsorption by regenerating the bed with hot scavenging gas. Since the operation for both adsorption and regeneration is continuous without need for alternating the cycles the apparatus hereof may be greatly simplified to construct the same without valves, timing devices, etc. as in conventional construction for operating a desiccant bed with alternating flows of gas therethrough.

This invention embodies the principle that if moisture is adsorbed in one portion of a desiccant material that adsorbed moisture will progressively diffuse throughout the body of desiccant material tending to be distributed evenly throughout such body. Conversely, if moisture is continuously removed from one portion of such bed of desiccant material, that dryer portion would tend to readsorb moisture as fast as it is removed by such diffusion from the rest of the bed whereby the bed in each case, always tending to set up an equilibrium condition wherein the moisture is homogeneously distributed throughout, continuously redistributes its moisture as it is adsorbed or removed.

There are obstacles to be overcome in designing such system for optimum economy of operation primarily due to the fact that as moisture is adsorbed the latent heat of condensation is taken up by the desiccant material and the gas itself becomes warmer and simultaneously with the increased temperature of the bed, the ability of the bed to adsorb moisture decreases. Accordingly, it is necessary to interrupt such heat cycles to obtain efficient operation.

According to the present invention, a bed of drying material is divided into sections, the one section of which is mounted for continuous operation as an adsorbent for moisture laden gases to extract the moisture therefrom as the gas is continuously passed therethrough. The other section of said bed is designed to be a regenerating portion and scavenging gas, either hot scavenging gas or the bed itself being heated to supply the heat necessary to drive off moisture from the desiccant material, is continuously passed through that heated portion. The two sections of the bed are separated by a foraminous barrier material which will allow passage of moisture from one section to the other by continuous diffusion and at the same time prevent substantial heat transfer by having a porous heat insulating structure inherently having that property.

The foraminous structure is designed to have good moisture diffusion properties which does not require large porous interstices comprising its body for such moisture transfer, as compared to a porous body which does not substantially impede the flow of air such as the granular desiccant material per se. Thus with such foraminous barrier, while gas may pass through separated bed sections along either side thereof, there will not be substantial penetration of the barrier by gas flowing through the barrier from one section of the bed to the other to substantially affect its respective function.

There is substantially great economy of operation of a system of this character even when a small fraction of the gases passing through either section interchanges across the foraminous barrier from one section to the other. In fact, it is often desirable to bleed a small portion of gas passing through the dehumidification section to be dried into the regeneration section being heated, across the foraminous barrier, because that slight flow, while not substantially impairing the economy, enhances the rate of diffusion of moisture from the dehumidification section to the regeneration section, thereby increasing the tendency of both to establish equilibrium, and thereby more rapid removal of the moisture adsorbed from the system.

Accordingly, in a modification of this invention, a pressure differential may be set up between the two sections by applying a slight or even great vacuum to the regenerating section. The foraminous barrier of such modification is made of sufficiently reduced porosity in such instance to allow only a minor flow of gas into the regenerating section from the dehumidifying section. Thus the regenerating by heating of the adsorbent bed comprising the regenerating section or the heating of the scavenging gas passed therethrough to effect its regeneration while being maintained under a substantial vacuum, allows regeneration of the desiccant in the regenerating section at a lower temperature necessary to vaporize the moisture adsorbed by diffusion thereinto, corresponding to the degree of vacuum imposed.

Thus, the porosity of the foraminous barrier material may be such as to be only slightly less than that of the granular desiccant so that where none or only slight vacuum is applied to the regenerating section the passage of gas from the adsorbing section merely operates to accelerate the diffusion of moisture while bleeding a small quantity of gas from the dehumidifying section, the slight vacuum having very little effect upon the regenerating temperature, if any. Where higher vacuums are imposed in the regenerating section the foraminous barrier will have such reduced porosity that a similarly small quantity of gas will pass into the regenerating section for aiding diffusion of moisture therein but the reduced porosity of the barrier will not impede passage therethrough by diffusion, and the vacuum produced in the regenerating section may be so substantial that the temperatures required for regeneration of that regenerating section may be greatly reduced in relation to that vacuum to effect substantial economy thereby in operation.

The foraminous barrier material may be fibrous material such as animal, vegetable, or mineral fiber of matted or felted texture, porous ceramic ware, or hardened foam rubber or foam plastic which will not soften at temperatures normally encountered in regeneration such as about 350° F. or lower. A preferred foraminous barrier material is matted asbestos fiber formed as described in U. S. patent to Thomas H. Urdahl 2,621,753 issued December 16, 1952. The foraminous barrier material in sheet or board form, formed or bent to desired shape such as cylindrical, is made sufficiently thick, variable with the strength of the material, to mechanically support the weight of the bed of desiccant material in contact therewith. The integral strength of the foraminous barrier material, however, may be enhanced and reinforced where needed by having metal or plastic screening mounted adjacent to or laid integrally in a surface thereof for reinforcement or screening may be embedded within the body of the foraminous material for reinforcement. The screening itself is of such large mesh as to perform this reinforcing function without in itself affecting the gas or vapor flow thrugh the barrier material.

That framinous barrier material, moreover, will have relatively small pores to allow gas and vapor passage through the pores of the fiber, of a size less in any case than the interstices between the granular particles of desiccant materials as a maximum size. The average size of the pore will vary progressively smaller from that maximum size to reduce the porosity in direct proportion to any vacuum applied in the regenerating section of the desiccant to impede gas flow therethrough to not over about 10% and preferably not over 3% of the total gas passed for dehumidification at atmospheric pressure through the drying section. However, the pores will always be large enough to allow moisture diffusion through the barrier. Thus where both sections of the drying apparatus are operated at atmospheric pressure for adsorption and regeneration, the size of the pores will merely be somewhat less than the interstices between granular particles of desiccant which usually range from about 5 to 20 mesh in size; and where the regenerating section is operated under reduced pressure the porous structure thereof will be reduced to prevent passage of more than about 10% of gas from the drying section under atmospheric pressure to the regenerating section under any particular degree of vacuum for which it is designed. The thickness of the foraminous barrier material is not critical except where no reinforcing elements are used for its support in which case the thickness will be large or small depending only upon uneven stresses encountered in its service which is usually negligible. The foraminous barrier material will usually range in thickness from about 1/16 to about 1/2 inch, preferably between 1/8 to 1/4 inch.

In contrast to such barrier material the granular desiccant material is highly porous, usually varying in particle size from about 5 to 20 mesh, whereby the interstices between the particles as well as porous internal structure of each, present little if any resistance to the flow of gases through a granular bed of this material. In general, the granular desiccant material will be those usually used in the art such as granular silica gel, granular activated alumina or other known granular desiccant materials.

As a practical matter, any matted fibrous body, porous ceramic ware, or foam rubber allows passage of gas and moisture at a substantially lower rate than would be present in such bed of granular desiccant and could be used for atmospheric pressure operation herein.

As an example of barrier material suitable in the above construction, and as described in the Urdahl patent above referred to, asbestos is graded as to be readily matted, all of the smaller fibers shorter than about 1/8 inch having been removed so that the asbestos does not tend to pack or felt. The asbestos fiber of uniformly large size is desirably washed to remove all particles of dust-like character. The fiber is suspended as a slurry in water to which may be added a small quantity of a water soluble binder, such as from .05 to 3% by weight of the water suspending medium, of a binder such as water soluble phenol-aldehyde or furfural resins or ordinary cold water starch. The asbestos slurry is then passed through a screen as typically used in paper making to form a sheet or mat of desired thickness; or, where it is desired to construct the foraminous barrier material with internal reinforcement, a corresponding thin glass fiber sheet or mat or a metal screen is placed as a layer over a first matted portion as deposited, and a second layer of asbestos is deposited thereon to the desired thickness. As mentioned such thickness may be from 1/16 to 1/2 inch, preferably about 1/8 to 1/4 inch, in thickness. The mat thus formed with or without the reinforcing layer embedded therein may be dried to an empirical dryness merely by passing warm air through and around it. The entire sheet thus deposited may be bent into cylindrical form with its ends fixed by any suitable binder such as a metallic strip seal. Alternatively, the entire matted material may be deposited upon a cylindrical screen internally or externally or both so that no seaming is present in the cylindrical form thus obtained. Finally, the cylindrical barrier material is dried by heating as stated or where a binder is used the temperature is sufficient to decompose the organic binder material, such as a temperature of 250 to 400° C.

Where degree of porosity is desirably reduced for purpose of imparting greater resistance to gas flow in use under vacuum bed regenerating conditions, it is necessary only, after the wet matted fiber has been deposited upon the screen from a slurry, to apply pressure to the wet sheet by placing between the platens of a press and drying by heating the platens. The porosity of the sheet is reduced in direct proportion to the pressure applied so that a sheet of any desired degree of porosity, by drying under various pressure conditions, is readily produced. Thus in the instance of asbestos fiber, it may be dried as described under pressure conditions ranging from open atmospheric to about 200 p. s. i.

It will be appreciated that gas flowing through a desiccant material will follow its normal path of least resistance and even though one of the confining walls of said bed may be the foraminous barrier described above, little of it will pass through such barrier where the resistance thereof to gas flow therethrough is greater than the resistance to passage through any normal outlet duct. The passage of moisture, however, from the desiccant material through that foraminous material in contact therewith will be continuous since the passage is by simple diffusion according to well known physical principles which is not directly related to the size of the pores. Thus by simple diffusion, the moisture adsorbed will pass across said foraminous barrier to succeeding sections of the drier containing desiccant for even redistribution of adsorbed moisture from one section to another.

The attached drawings illustrate apparatus embodying operation of this principle. Certain additional advantages to this construction will be inherent in the description which now follows in which Fig. 1 illustrates a gas drier having an adsorbent bed divided into sections for adsorbing moisture from the system, both such sections being designed for operation at atmospheric pressure;

Fig. 2 is an enlarged diagram of the closed apparatus illustrating its assembly;

Fig. 3 is a diagram of an electrical circuit used therein for operation of heating element;

Fig. 4 illustrates a modification wherein the regenerating section is adapted to operate under reduced pressure;

Fig. 5 is an enlarged detail partially in perspective to illustrate internal construction of a portion of the apparatus of Fig. 4;

Fig. 6 is an enlarged detail showing support of the barrier ends.

Referring to Fig. 1, a cylindrical housing 10 has a pair of circular angle iron brackets 11 and 12 fastened to the inner wall, symmetrically spaced above and below the center and separated vertically from each other to support a lower screen 13 and upper screen 14 horizontally across the cylindrical casing, and fastened respectively at their peripheral edges to the brackets 11 and 12 in any suitable manner such as by bolting or welding. The cylindrical casing 10 has a bottom 15 which may be integral with the side walls and a circular top 16 which may be flanged at 17 at the edges to fit about the cylindrical side 10. Depending downward conically angular, and supported from the top plate 16 as by bolting 18, is a conical inner shell wall 19 disposed a substantial distance inward from the cylindrical walls 10. A similar conical shell 20 is mounted conically upward as by bolting at 21 from the bottom 15. Suitable angle iron brackets 24 may be mounted to the conical shells 19 and 20 at their inner ends to screens 13 and 14 for suitable intermediate reinforcement. As illustrated in enlarged detail Fig. 6, the angle irons 24 circularly mounted on both sides of and slightly below the ends of the conical shells 19 (and 20 not shown in detail) form a groove or channel 22 between them and the end of the conical shell in which the end of the cylindrical foraminous barrier is secured. As thus far described the device comprises a cylindrical housing which has mounted therein an inner annular shell, the mid portion of which is foraminous, the entire inner shell dividing the housing vertically into an inner section A and an outer section B.

A bed of granular desiccant material such as silica gel is mounted between both bottom and top screens 13 and 14 horizontally entirely across the diameter of the cylindrical housing 10 to form a bed of variable height from several inches to several feet depending upon the design capacity of the device for dehumidification. The bed of granular desiccant material itself comprises two sections, a dehumidification or gas drying section B, and a moisture regenerating section A, divided by the foraminous wall 23 having the structure such as for example ¼ inch cylindrical shell of matted fiber asbestos prepared as described above. The foraminous wall 23 may be further reinforced on the regeneration section side A by a vertically mounted cylindrical screen 25 adjacent thereto and contacting the same for support. That screen 25, used merely for reinforcement, is of substantially larger mesh than screens 13 and 14, which are small enough to retain the granular desiccant. The reinforcing screen 25 is at least about ½ inch mesh, and preferably larger, so that the silica gel body comprising the bed portion in chamber A will be in direct contact with the foraminous wall 23 in the same manner as bed portion B.

The open chamber portions above the bed A and B separated by the imperforate conical wall 19 comprise separae gas inlet plenum chambers, the chamber 26 in the section A comprising a plenum which communicates with a reactivation gas inlet 27 which provides air from an extraneous source for reactivation of the bed in section A, and the plenum chamber 28 in section B takes its air from inlet 29 comprising air which is to be dehumidified by passage through bed section B. There are corresponding plenum chambers beneath both sections of the bed. The plenum chamber 30 in section A takes the reactivation waste gas laden with moisture driven off from the adsorbent material of the bed in section A and passes the same out of outlet 31 to a waste gas disposal area. Similarly, plenum chamber 32 in section B receives the dry air coming from the bed section B after dehumidification and passes the same to dry air outlet 33.

The bed section A, for regeneration, may be heated in any suitable manner, for instance, the gas itself for regeneration may be from some available hot gas supply or the gas may be heated extraneously in air heaters (not shown). But it is preferred for accurate regeneration control to embed conventional electrical resistance heating wires 34 in the bed section A for supply of heat thereto. Such heating wires may have the construction as shown in my prior Patent 2,671,525, and such heating wires may be placed in circuit with a thermostat 35 which accurately controls the range of temperature supplied for regeneration in the bed, the entire electrical system being actuated by electrical current flowing thereto through lines 36 such for example as 110 volt A. C. current.

As shown diagrammatically in Fig. 2 a fan or blower 37 may be mounted in the regeneration air inlet for forcing passage of gas therefrom down through the bed regeneration section A and thence outward through outlet 31 to a waste gas disposal area by way of plenum 30. Similarly a blower or fan 38 may be mounted to communicate with the humid air inlet 29 to force air through the bed section B by way of plenum 28 and thence, after being dried by passage through the bed section B, outward through dry air outlet 33 by way of the lower plenum 32.

In operation humid gas such as air continuously passes as forced by blower 38 into the annular upper plenum 28 down through the bed portion B and thence outward through outlet 33 as dehumidified or dried air, the granular desiccant silica gel in section B of the bed being operative to adsorb the moisture therefrom. Simultaneously, the bed section A is heated by electric current passing through the heating wires to the desired temperature range of 220 to 350° F. as controlled by the thermostat 35 and gas such as air from an extraneous source leading to duct 27 is continuously passed downward through the bed section A as forced by fan 37 and picks up moisture diffused in bed section A and vaporized and passes the same outward through outlet 31 by way of plenum 30 beneath the bed section A. As moisture is adsorbed in the bed section B that moisture will redistribute itself continuously throughout the bed section B and will pass through the foraminous barrier 23 diffusing evenly into bed section A from which it is removed. Since there is greater resistance of foraminous barrier 23 to passage of air between sections B and A than there would be for gas being dehumidified in bed section B to merely pass from plenum 28 vertically downward through the bed section B and thence to plenum 32, the gases passing independently through sections A and B being at the same pressure, there will be substantially no gas exchange as such between bed sections A and B. It will thus be seen that both regeneration and dehumidification take place continuously and simultaneously with continuous and simultaneous diffusion of moisture adsorbed from one section B across the foraminous barrier 23 into the section A from whence it is removed by heating and being suspended as vapor into the scavenging gas passed through section A for removal from the system.

The modification shown in Figs. 4 and 5 is designed to reduce the pressure by application of a vacuum in varying degrees to the bed section A to enhance the rate of diffusion of moisture from bed section B while allowing some gas leakage through the barrier for that purpose. To this end the device comprises a cylindrical housing 50 having a top 51 and a bottom 52 completing the same. In this instance a bed is mounted horizontally and supported between screens 53 and 54 attached to circular angle irons 55 fastened to the housing wall 50. A body of granular adsorbent material such as silica gel 56 is disposed near the cylindrical wall 50 as radially confined on the inner central side by a cylindrical screen 57 suitably reinforced by vertical bracketing angle irons 58.

As in Fig. 1, a cylindrical foraminous wall 59 is disposed within the bed to divide it into sections, a dehumidification section B on the outer side of the wall as in Fig. 1, and a regenerating section A on the inner side of the wall between the vertical screen 57 and the foraminous barrier 59. However, the bed section A, 60, in this modification, between the screen 57 and foraminous wall 59, is quite narrow and comprises merely sufficient bed material, silica gel, to allow continuity of diffusion of moisture between bed portions B and A across the foraminous barrier wall 59. Moreover, the section A is otherwise entirely enclosed to form a central regenerating section which may be operated under substantially reduced pressure by being entirely enclosed by an upper imperforate plate 61 which terminates at its edge in a groove 62 formed between outer and inner parallel flanges at and near the periferal edge of disc 61 (not shown) and in which the upper edge of the cylindrical barrier 59 is sealed and an imperforate bottom plate 63 terminating at its peripheral edge in a groove 64 in which the bottom edge of the cylindrical barrier wall 59 is sealed. For additional reinforcement of the center portion, T-irons 65 are mounted beneath the bottom plate 63 for horizontal support, the ends of such irons being fastened to the cylindrical wall 50 of the outer shell by welding, such irons being sufficiently separated as not to affect passage of gas being dehumidified outward from lower screen 53. The pressure resistant or vacuum chamber A is likewise vertically reinforced by the vertically disposed angle irons 58 fastened to the plates 61 and 63 near their edges.

The top portion 51 of the housing 50 has centrally mounted therein a fan 66 actuated by a motor ($M_1$) 67. The fan 66 draws humid gas into the shell from a source of gas to be dehumidified through an opening 68, such gas being filtered free of dust by a batt of metal wool comprising a filter 69. The humid gas then passes down into the upper plenum chamber B and thence down through the bed section B for dehumidification. The dried gas then passes into a lower plenum B by way of lower screens 53 at the bottom of the bed and thence to an outlet 70 leading to a dry air disposal area. The inner pressure resistant vacuum chamber A has an opening 71 in the bottom thereof with which a duct 72 communicates and has in circuit therein a vacuum pump or induced gas blower or fan 73 taking suction therefrom, and passing the gas to a waste gas disposal area through duct 74.

As shown in the detail of Fig. 5 a conventional electric coiled resistance wire 75 may be mounted annularly in the cylindrical bed section A within the granular material thereof for imparting heat as necessary. It will be appreciated that a relatively smaller quantity of heat will be necessary in the bed section A of the modification of Figs. 4 and 5 since by this construction the chamber A will be held under reduced pressure and the vacuum therein may be substantially high. For example, where the pressure is reduced from the usual atmospheric of about 14.7 p. s. i., which requires a temperature to be produced in the bed of at least 212° F. and a heat input of at least 970 B. t. u. per lb. of water evaporated for vaporization thereof to effect regeneration, and usually somewhat higher to adjust for the rate of regeneration desired, reduction of pressure will correspondingly reduce this temperature. For example, at a pressure reduced to about 1 lb. absolute, the boiling point of the liquid is down to about 100° F. although the B. t. u.'s required for vaporization is silightly larger. In practice, for regeneration, the temperature of the bed may be maintained in the range of 100 to 150° F. under the high vacuum conditions, but that, it will be apparent, is a substantial economy in heat input. For that high vacuum condition of regeneration, the foraminous barrier 59 will be of such reduced porosity, by having extremely small pores, that the quantity of gas flowing through the barrier from the higher atmospheric pressure condition of the gas in the bed section B being dehumidified will not be more than about 10% of gas through the foraminous barrier and preferably not more than 3% of the dried gas.

Thus for normal operation of the modification shown in Figs. 4 and 5 the fan 66 mounted within the plenum chamber B will continuously draw air through opening 68 filtering out dust in the fiber batt 69 and pass the same downward through bed section B, drying the same in contact with the silica gel 56 therein and then outward from the lower plenum section B through opening 70 as dry gas. Simultaneously motor $M_2$ (Fig. 3) continuously drives the vacuum pump 73 which draws a vacuum in the chamber A, the electrical coil 75 being activated to heat that portion of the bed within chamber A and vaporize moisture therefrom under vacuum conditions, the moisture being withdrawn through duct 72 by way of pump 73 and thence outward through duct 74 to a moist gas disposal area. Moisture adsorbed in the bed section B continuously diffuses across the foraminous barrier 59 into the bed section A together with a small amount of gas such as about 3% of the gas normally passing through bed section B to aid the diffusion of moisture and thence outward from the system by way of chamber A and duct 72.

No valves are necessary in either form of apparatus shown and both types of drying systems, with or without vacuum, operate continuously with simultaneous dehumidification of gas in one section of a bed B and regeneration of a second section of a bed A into which moisture adsorbed in the first section diffuses for ultimate removal from the system.

Certain modifications will occur to those skilled in the art. Scavenging gas used for the removal of moisture from the bed in normal atmospheric pressure operations may be partially heated in heat exchange from gas slightly warmed after passing through the bed to be dried. If desired, the gas used for regeneration of the bed may be extraneously heated prior to passing in contact therewith thereby obviating the need for electrical heating units embedded within the bed per se.

Fig. 3 shows a typical electrical hookup useful for supply of current to actuate pump or blower motors, for supplying current to electrical heater elements within the bed and for control of the temperature thereof. As shown therein electrical current is taken from a suitable source such as 110 volt 60 cycle A. C. through lead wires 36 having in the circuit any conventional switch S which may be manually operated to activate the circuit, the current passing through both motors $M_1$ and $M_2$. A portion of the current is also in circuit with the resistance wires R corresponding to electrical heater elements 34 and 75 which may further be controlled by a thermostat T corresponding to the element 35 in Fig. 1.

I claim:

1. The method of drying gas comprising passing gas to be dried through a first portion of a bed of granular desiccant material, passing a scavenging gas through a second portion of said bed of granular desiccant material while maintaining said second bed portion under conditions of temperature and pressure at which moisture diffused therein will be vaporized into the scavenging gas, and maintaining said sections of the bed of granular desiccant material separated by a foraminous barrier having sufficient porosity to allow diffusion of adsorbed moisture between both sections of said bed material while inhibiting substantial passage of gases from the first bed section to the second.

2. The method as defined in claim 1 wherein the foraminous barrier material is selected from the group consisting of matted fibrous material, porous ceramic ware, and foam plastic each having a porosity substantially less than the porosity of the granular desiccant material comprising said bed.

3. The method of drying gas continuously comprising passing the gas to be dried through a first section of a bed of granular desiccant material, said bed having a second section of said granular material separated from the first by a foraminous material barrier, said barrier material having a porosity sufficient to allow moisture diffusion therethrough in contact with said bed of desiccant material to both sections of said bed while resisting substantial gas flow under a substantial pressure differential of gases on both sides of said barrier, reducing the pressure of gases on the second bed section by a vacuum pump to a substantially lesser pressure than atmospheric and simultaneously applying sufficient heat to said second bed section desiccant material to cause continuous vaporization of moisture diffused therein from said first bed section.

4. Apparatus for drying gas comprising a housing enclosing a chamber, a bed of granular desiccant material disposed in said chamber divided into a gas drying section and a moisture regenerating section by a foraminous barrier separating said sections, said foraminous barrier comprising a porous material having a porosity sufficiently less than the porosity of said granular desiccant material comprising said bed so as to impede exchange of gases passed through said bed in either section while allowing moisture diffusion in said bed from one section to the other, means for passing gas to be dried into the drying section of said bed and withdrawing the dry gas after passing through said bed drying section from said housing and means for passing a scavenging gas for regeneration of said bed at a temperature sufficiently high to entrain moisture evolved from said bed to the regenerating section of said bed and independently withdrawing the scavenging gas therefrom for disposal thereof outside of said housing.

5. Apparatus as defined in claim 4 wherein the foraminous barrier material is selected from the group consisting of matted fibrous material, ceramic ware, and foam plastic each having a porosity substantially less than the porosity of the granular desiccant material comprising said bed.

6. Apparatus for drying gas comprising a housing enclosing a chamber, a bed of granular desiccant material disposed in said chamber divided into a gas drying section and a moisture regenerating section by a foraminous barrier separating said bed into said sections, a pressure resistant subhousing within said main housing having said foraminous barrier as one of its walls and enclosing the regenerating section of said bed, said foraminous barrier having a porosity sufficiently reduced to allow gas flow from the drying section of said bed to the regenerating section across said barrier to an extent not exceeding about 10% of the gas passed through said drying section under the pressure differential imposed by reducing the pressure in said regenerating section, a vacuum pump communicating with said regenerating section adapted to reduce the pressure therein and conduct moisture laden gases pumped therefrom to a waste gas disposal area and means for passing gas to be dried through said gas drying section and means for withdrawing dry gas therefrom and passing the same out of said chamber, and means for heating said regenerating section sufficient to vaporize moisture diffused thereinto under the pressure conditions established by said vacuum.

7. Apparatus for drying gas comprising a housing enclosing a chamber, a bed of granular desiccant material disposed in said chamber divided into a gas drying section and a moisture regenerating section by a foraminous barrier separating said sections, said foraminous barrier comprising a porous material having a porosity sufficiently less than the porosity of said granular desiccant material comprising said bed as to impede exchange of gases passed through said bed in either section while allowing moisture diffusion in said bed from one section to the other, means for heating the moisture regenerating section of said bed, means for passing gas to be dried into the drying section of said bed and withdrawing the dry gas after passing through said bed drying section from said housing and means for passing a scavenging gas to the regenerating section of said bed to entrain moisture evolved therefrom and independently withdrawing the scavenging gas for disposal thereof outside of said housing.

8. Apparatus as defined in claim 6 wherein the foraminous barrier material is selected from the group consisting of matted fibrous material, ceramic ware, and foam plastic each being moisture permeable and having a porosity sufficiently reduced to allow gas flow therethrough under the pressure differential of gases across said foraminous barrier between bed sections to an extent not exceeding about 10% of the gas passed through said drying section.

9. Apparatus as defined in claim 7 wherein the foraminous barrier material is selected from the group consisting of matted fibrous material, ceramic ware, and foam plastic each having a porosity less than the porosity of the granular desiccant material comprising said bed.

10. The method as defined in claim 1 wherein the foraminous barrier material is matted asbestos fiber.

11. The method as defined in claim 3 wherein the foraminous barrier material is matted asbestos fiber having a porosity sufficiently reduced to allow a gas flow therethrough of less than about 10% of the gas passed through the drying section of said bed under the pressure differential between said bed sections.

12. Apparatus as defined in claim 4 wherein the foraminous barrier material is matted asbestos fiber.

13. Apparatus as defined in claim 6 wherein the foraminous barrier material is matted asbestos fiber having a porosity reduced to allow a gas flow between said bed sections not exceeding about 10% of the gas passing through the drying section of said bed under the pressure differential between bed sections.

14. The method of drying gas comprising passing gas to be dried through a first portion of a bed of granular desiccant material, passing a scavenging gas from an independent extraneous source through a second portion of said bed of granular desiccant material while maintaining said second bed portion under conditions of raised temperature at which moisture diffused therein will be vaporized into the scavenging gas, maintaining said sections of the bed of granular desiccant material separated by a foraminous barrier having sufficient porosity to allow diffusion of adsorbed moisture between both sections of said bed material while inhibiting substantial passage of gases from the first bed section to the second, both of said bed sections being maintained under substantially the same pressure whereby the tendency of gas passing through one section into the other is substantially absent.

15. Apparatus for drying gas comprising a housing enclosing a chamber, a bed of granular desiccant material disposed in said chamber divided into a gas drying section and a moisture regenerating section by a foraminous barrier separating said sections, said foraminous barrier comprising a porous material having a porosity sufficiently less than the porosity of said granular desiccant material comprising said bed as to impede exchange of gases passed through said bed in either section while allowing moisture diffusion in said bed through said barrier from one section to the other, means for passing gas to be dried into the drying section of said bed and withdrawing the dry gas after passing to said bed drying section from said housing, and means for passing a scavenging gas from an independent extraneous gas source for regeneration of said bed at a temperature sufficiently high to entrain moisture evolved from said bed to the regenerating section of said bed and independently withdrawing the scavenging gas therefrom for disposal thereof outside of said housing to an area apart from the dried gas, both said means for passing gas to be dried into the drying section and means for passing scavenging gas from an extraneous source into the regenerating section of said bed being adapted to supply gas at substantially the same pressure whereby the tendency of gas passing through said bed sections to interchange across said barrier is substantially absent.

16. The method of drying gas with a granular desiccant material comprising passing a gas to be dried through one section of a bed of granular desiccant material to absorb the moisture therefrom, passing a scavenging gas through another section of said bed of granular desiccant material contiguous to said first bed section under bed regenerating conditions of raised temperature to remove moisture therefrom, and maintaining said contiguous bed sections of granular desiccant material separated by a foraminous barrier having a porosity sufficient to allow diffusion of moisture between said bed sections while substantially impeding free passage of gas therethrough.

17. Dehumidifying apparatus comprising a bed of granular desiccant material divided into contiguous sections by a barrier of foraminous material, said foraminous material barrier having a porosity sufficient to allow diffusion of moisture between said contiguous bed sections but reduced sufficiently to impede free flow of gas between said bed sections, means for passing gas to be dried through one of said bed sections, and means for passing a scavenging gas through the other contiguous section of said bed under conditions of raised temperature to remove moisture therefrom.

References Cited in the file of this patent

UNITED STATES PATENTS

| | | |
|---|---|---|
| 1,934,075 | Lewis | Nov. 7, 1933 |
| 1,964,391 | Thomas | June 26, 1934 |
| 1,966,034 | Heusler | July 10, 1934 |
| 2,215,323 | Guthrie | Sept. 17, 1940 |
| 2,517,537 | Anderegg | Aug. 8, 1950 |
| 2,621,753 | Urdahl | Dec. 16, 1952 |

FOREIGN PATENTS

| | | |
|---|---|---|
| 409,652 | Great Britain | Aug. 2, 1932 |
| 733,079 | Germany | Mar. 18, 1943 |